United States Patent [19]
Widman et al.

[11] Patent Number: 5,693,268
[45] Date of Patent: Dec. 2, 1997

[54] WEDGE DEMOLDING OF CAST LENS MOLD ASSEMBLIES

[75] Inventors: Michael F. Widman; Daniel Tsu-Fang Wang; Henri A. Dagobert, all of Jacksonville, Fla.

[73] Assignee: Johnson & Johnson Vision Products, Inc., Jacksonville, Fla.

[21] Appl. No.: 626,730

[22] Filed: Apr. 1, 1996

[51] Int. Cl.$^6$ ................................................. B29D 11/00
[52] U.S. Cl. .................... 264/1.1; 264/1.36; 264/101; 264/334; 425/174.4; 425/451.7; 425/808
[58] Field of Search ........................ 264/1.1, 1.36, 264/334, 335, 101; 425/174.4, 451.7, 452, 453, 454, 808, DIG. 5

[56] References Cited

U.S. PATENT DOCUMENTS

| | | | |
|---|---|---|---|
| 2,365,764 | 12/1944 | Kastner | 264/334 |
| 3,851,038 | 11/1974 | Meyer | 264/334 |
| 4,535,689 | 8/1985 | Putkowski | 425/451.7 |
| 4,786,444 | 11/1988 | Hwang | 425/808 |
| 5,137,441 | 8/1992 | Fogarty | 425/808 |
| 5,160,749 | 11/1992 | Fogarty | 425/808 |
| 5,358,672 | 10/1994 | Blum | 264/334 |
| 5,417,557 | 5/1995 | Ross et al. | 264/334 |
| 5,560,941 | 10/1996 | Hegler et al. | 264/286 |

*Primary Examiner*—Mathieu D. Vargot

[57] ABSTRACT

Demolding apparatus for reliably and repeatedly mechanically separating contact lens mold assemblies without damaging the contact lens formed therebetween. The mold assembly includes a frontcurve mold having a central mold section with a surrounding flange, and a corresponding backcurve mold also having a central mold section with a surrounding flange, with a contact lens being molded therebetween. A support pallet is provided for supporting the mold assembly. A wedge separating fixture provides at least one separating wedge positioned between the spaced flanges of the mold assembly, and the wedge separating fixture and support pallet are translated relative to each other to progressively separate the frontcurve mold from the backcurve mold. In one embodiment the wedge separating fixture is stationarily mounted suspended above the support pallet, and a drive conveys the support pallet relative to the stationarily mounted wedge separating fixture to a position whereat the separating wedge is positioned between the spaced flanges of the mold assembly and separates or demolds the frontcurve and backcurve molds.

38 Claims, 11 Drawing Sheets

WEDGE DEMOLDING OF CAST LENS MOLD ASSEMBLIES

BACKGROUND OF THE INVENTION

1. Field of the Invention

The present invention relates generally to a wedge demolding apparatus and method for demolding cast lens mold assemblies wherein a molded assembly, comprising a frontcurve, a spaced backcurve, and a molded lens formed therebetween, are separated or demolded in a manner which improves the simplicity and efficiency of the demolding operation.

More particularly, the subject invention pertains generally to an apparatus and method for producing ophthalmic contact lenses in cast contact lens mold assemblies, and in particular to a method and apparatus providing for the improved removal of molded ophthalmic contact lenses from the molds in which they are cast. The present invention is particularly well suited to molded ophthalmic lenses such as hydrogel contact lenses, although it also has applicability to other small, high-precision ophthalmic lenses such as intraocular lenses.

The present invention is related to patent application Ser. No. 08/257,801, filed Jun. 10, 1994, for LASER DEMOLDING APPARATUS AND METHOD, and is also related to patent application Ser. No. 08/258,265, filed Jun. 10, 1994, for LASER SEPARATION METHOD AND APPARATUS.

2. Discussion of the Prior Art

As the ophthalmic lens industry has grown, and in particular the industry related to supplying contact lenses which are provided for periodic frequent replacement, the number of contact lenses required to be produced has increased dramatically. This has spurred manufacturers to strive for automated methods and apparatus which are adaptable to automated practices and consistent performance.

It is generally known in the prior art to make ophthalmic lenses, such as soft hydrogel contact lenses, by molding a monomer or monomer mixture in a mold such as one made from polystyrene or polypropylene.

Examples of this prior art can be found in U.S. Pat. Nos. 5,039,459, 4,889,664 and 4,565,348. These patents discuss therein the requirement for a polystyrene mold in which the materials, chemistry and processes are controlled such that the mold portions do not require undue force to separate by sticking to the lens or to each other. In contrast to the above polystyrene molds, another example is the use of polypropylene or polyethylene molds as described in U.S. Pat. No. 4,121,896.

The mold assembly to mold an ophthalmic contact lens typically includes a lower concave mold portion referred to as a frontcurve and an upper convex mold portion referred to as a backcurve. The concave surface of the lower frontcurve and the convex surface of the upper backcurve define therebetween a mold cavity for a contact lens. A particular problem in the prior art is that the frontcurve and backcurve molds are usually surrounded by a flange, and the monomer or monomer mixture is supplied in excess to the concave frontcurve mold prior to the assembly of the molds. As the molds are placed together, defining the lens and forming an edge, the excess monomer or monomer mixture is expelled from the mold cavity and rests on or between the flange of one or both mold portions. Upon polymerization, this excess material forms an annular ring around the mold assembly which resists separation of the mold portions during a demolding operation.

One known prior art process for separating the mold portions applies heat to the backcurve mold by a heated air stream. The heated air stream is directed against the exterior of the backcurve mold, from which heat is conducted to the upper surface of the lens. Heat is transferred by thermal conduction through the backcurve mold, the molded lens, and the frontcurve mold. The heating of the backcurve mold can be performed in two sequential steps, a preheat stage and a heat/pry stage. In the heat/pry stage the mold is clamped in place, and pry fingers are inserted under the flange of the backcurve mold. A force is then applied to the backcurve mold by the pry fingers during a heating cycle. When the required temperature has been reached, the backcurve mold breaks free and one end thereof is lifted by the pry fingers. After the backcurve mold portion has been detached from the frontcurve mold portion on at least one side, the mold exits the heater. The backcurve mold and annular flashing are then totally removed.

While the aforementioned method has some efficacy in assisting in the removal of a lens from between opposed mold portions, the temperature gradient achieved from the heated backcurve mold across the lens to the frontcurve mold is relatively small. This prior art method has not been entirely satisfactory because the induced thermal gradient is not sufficient to fully and repeatedly separate the mold portions.

Accordingly, a second prior art method has also been developed wherein the backcurve mold portion is irradiated with electromagnetic radiation emanating from a laser, which is absorbed thereby to cause a substantial temperature gradient between the backcurve mold portion and the contact lens being demolded. The temperature gradient causes a differential expansion and shifting of the surface of the heated backcurve mold portion relative to the surface of the lens to lessen the adhesion therebetween to assist in the separation of the mold portions, while leaving the lens in the frontcurve mold portion. The backcurve mold portion is preferably irradiated by a laser producing radiation with a wavelength between 1 μm and 20 μm. The separating fingers are joined together to form a U-shaped separator, and the laser beam is directed through the U opening in the U-shaped separator to irradiate the backcurve mold portion.

Accordingly, much development has taken place in the prior art in methods of heating the backcurve mold prior to separation of the mold halves. However, the heating technique is only one aspect of the demolding process. The mechanical method for separating the mold halves is also a critical aspect of the demolding process. A single sided pry technique has been in use in one contact lens manufacturing line. This technique has been modified in various forms, all of which are based upon a discrete double sided or all sided movement. In all cases, the mold assembly has remained stationary while the mechanical separation or demolding operation is performed.

SUMMARY OF THE INVENTION

Accordingly, it is a primary object of the present invention to provide an improved wedge demolding apparatus and method for cast lens mold assemblies which can easily and repeatedly separate the lens mold portions without damaging the lens formed therebetween.

A further object of the subject invention is the provision of a method and apparatus for separating a backcurve mold from a frontcurve mold of a contact lens mold assembly which improves the simplicity and efficiency of the demolding operation. In a preferred embodiment, a substantial temperature gradient is created by any known prior art heating technique between the backcurve mold and the contact lens formed in the cavity of the contact lens mold assembly.

Another object of the present invention is to provide an automated apparatus and method for mechanically prying the mold halves apart in a consistent and reliable manner, to thereby enhance the production of defect-free contact lenses, and minimize tearing of the lens and breakage of the lens mold parts.

A further object of the subject invention is to perform such demolding or separation by using a stationary or moving wedge to separate the mold halves of a cast contact lens mold assembly, which can utilize any suitable type of heat transference, such one of the several embodiments disclosed herein.

The present invention concerns a mechanical technique employing a wedge, either stationary or moveable, which repeatably separates a backcurve mold from a frontcurve mold in a programmed manner, and then allows for vacuum removal of the backcurve mold. This technique can be employed with a variety of heating embodiments, and presents a simple, easy to clean, low-cost, very repeatable, and unique mechanical approach for separating or demolding cast contact lens mold assemblies.

The present invention has at least the following four primary novel features and advantages:

Continuous Processing

Existing demolding arrangements and processes are discrete operations with the product indexing into a stationary position. The mechanical demolding operation then occurs as a discrete sequence of events. The wedge demolding approach of the present invention when used with a discrete or semi-discrete heating process has the capability of being continuous in that the product never has to stop moving relative to the wedges. One advantage is that a very low wedge slope or profile would allow a much higher capacity at relatively little cost compared with existing prior art discrete processes.

Built-in Repeatability

By utilizing a well machined wedge profile with an appropriate pallet indexer or driver, the mold separation process is extremely repeatable because the separation geometry is directly mapped to the same profile every cycle. Different wedge profiles could be interchanged depending upon on which lens, lens mold design is being used.

Low Cost

Once a wedge profile and heating process is optimized for a given lens/lens mold design, multiple units of this design can be reproduced inexpensively relative to existing prior art discrete demolding operations.

Simplicity

Other than a heating process which is also required by existing prior art operations, the only moving part need be the product indexer or drive. All other components can remain stationary which makes maintenance and troubleshooting much easier.

In accordance with the teachings herein, the present invention provides an arrangement for demolding a mold assembly, which includes a frontcurve mold having a central mold section with a surrounding flange, and a corresponding backcurve mold also having a central mold section with a surrounding flange, with a contact lens being molded therebetween. The flanges of the frontcurve and backcurve molds are spaced apart and parallel to each other. A support pallet is provided for supporting the mold assembly. A wedge separating fixture provides at least one separating wedge positioned between the spaced flanges of the mold assembly, and the wedge separating fixture and support pallet are translated relative to each other to progressively separate the frontcurve mold from the backcurve mold.

In greater detail, the wedge separating fixture is stationarily mounted suspended above the support pallet, and a drive or indexer conveys the support pallet relative to the stationarily mounted wedge separating fixture to a position whereat the separating wedge is positioned between the spaced flanges of the mold assembly and separates or demolds the frontcurve and backcurve molds. An overhead vacuum duct is provided, positioned over the support pallet downstream of the wedge separating fixture in the direction of conveyance of the support pallet, for vacuuming up separated backcurve molds. Guide rails are also provided to mount the support pallet for translational movement relative to the fixedly mounted wedge separating fixture. The wedge separating fixture can include one wedge positioned on one side of the mold assembly, or two wedges positioned on opposite sides of the mold assembly.

In several preferred embodiments, the support pallet supports an n×m array of mold assemblies. In alternative embodiments, the wedge separating fixture can include one separating wedge for each row of the n×m array, or two separating wedges for each row, one positioned on each side of the row.

In alternative embodiments, the n×m array of mold assemblies can include a mold frame which interconnects an n×m array of frontcurve molds, with an individual backcurve mold placed over each interconnected frontcurve mold, or can include an n×m array of individual unconnected frontcurve molds, with an individual backcurve mold placed over each individual frontcurve mold. A hold down stabilizer bar can be positioned above the mold assemblies during the demolding operation to maintain the mold assemblies properly positioned in the support pallet during the demolding operation.

In several disclosed embodiments, the backcurve mold is heated such that heat is conducted by the backcurve mold to cause a temperature gradient between the backcurve mold and the lens being demolded, with the temperature gradient causing a differential expansion and shifting of the surface of the backcurve mold relative to the surface of the lens to lessen the adhesion therebetween to assist in separation of the molds, while leaving the lens in the frontcurve mold. The heating can be provided by any suitable arrangement, such as by a hot air plenum and nozzle for directing hot air onto the backcurve mold of the mold assembly, or by a radiant infrared heater and reflector for directing infrared radiation onto the backcurve mold of the mold assembly. In those embodiments wherein the support pallet supports an n×m array of mold assemblies, a heat mask can be positioned over the support pallet having n×m apertures, each having a diameter substantially equal to the diameter of a lens. Alternatively, a conductive heating probe assembly can be utilized, having an n×m array of conductive heating probes which contact each backcurve mold of the n×m array of mold assemblies, for conductively heating the array of mold assemblies. A lift cylinder raises and lowers the conductive heating probe assembly relative to the support pallet. During operation, the weights of the individual conductive heating probes are maintained on the array of mold assemblies during demolding to maintain the array of mold assemblies properly positioned in the support pallet during demolding. A lifting cam is provided to lift the conductive probe assembly from the pallet following demolding as an indexer conveys the pallet past the assembly lifting cam.

BRIEF DESCRIPTION OF THE DRAWINGS

The foregoing objects and advantages of the present invention for a wedge demolding apparatus and method may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
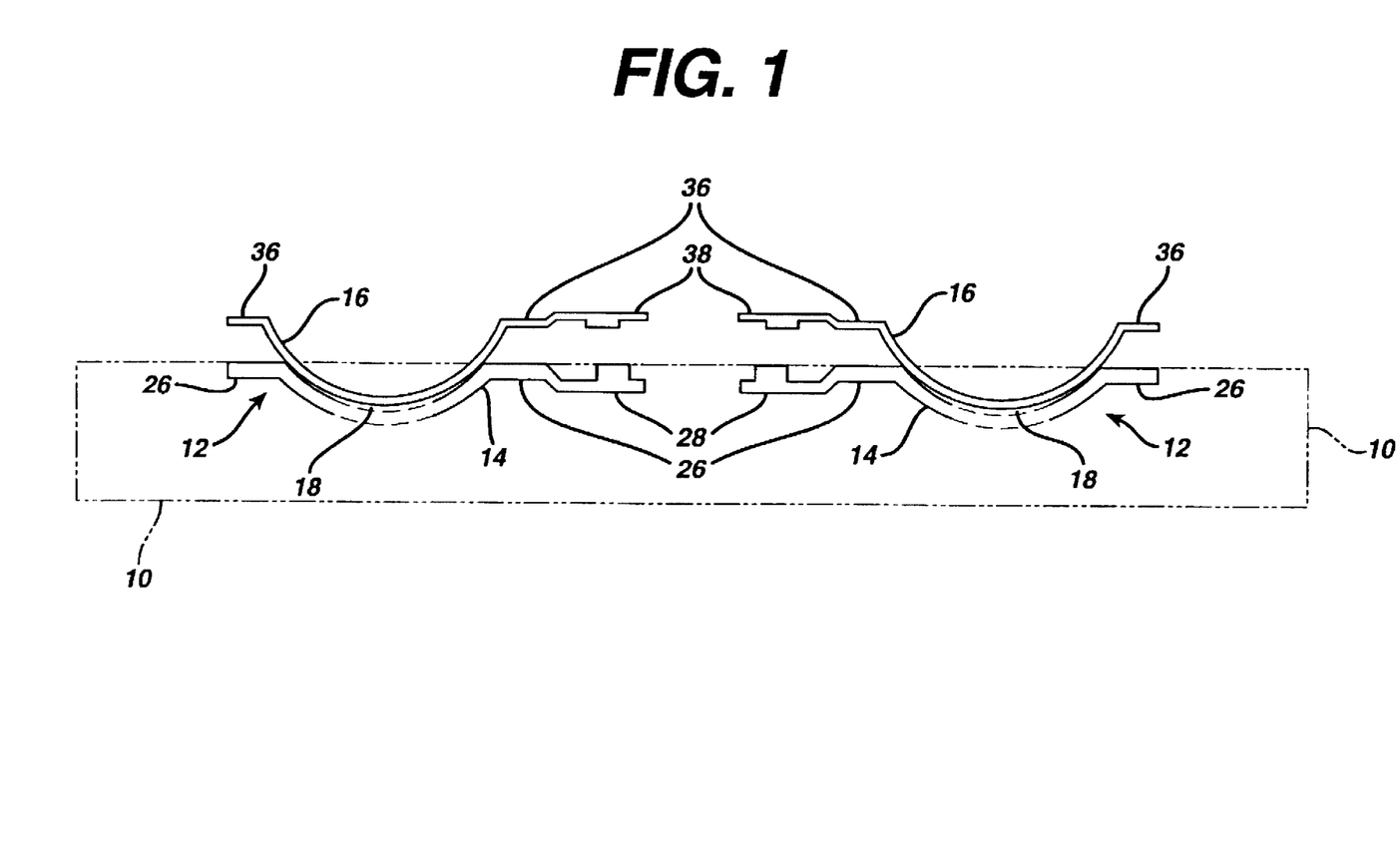
FIG. 1 illustrates a front elevational view of a support pallet which holds therein a two by four array of contact lens mold assemblies, each of which consists of a lower frontcurve mold and an upper backcurve mold, defining therebetween a mold cavity for a contact lens.
Figure 2:
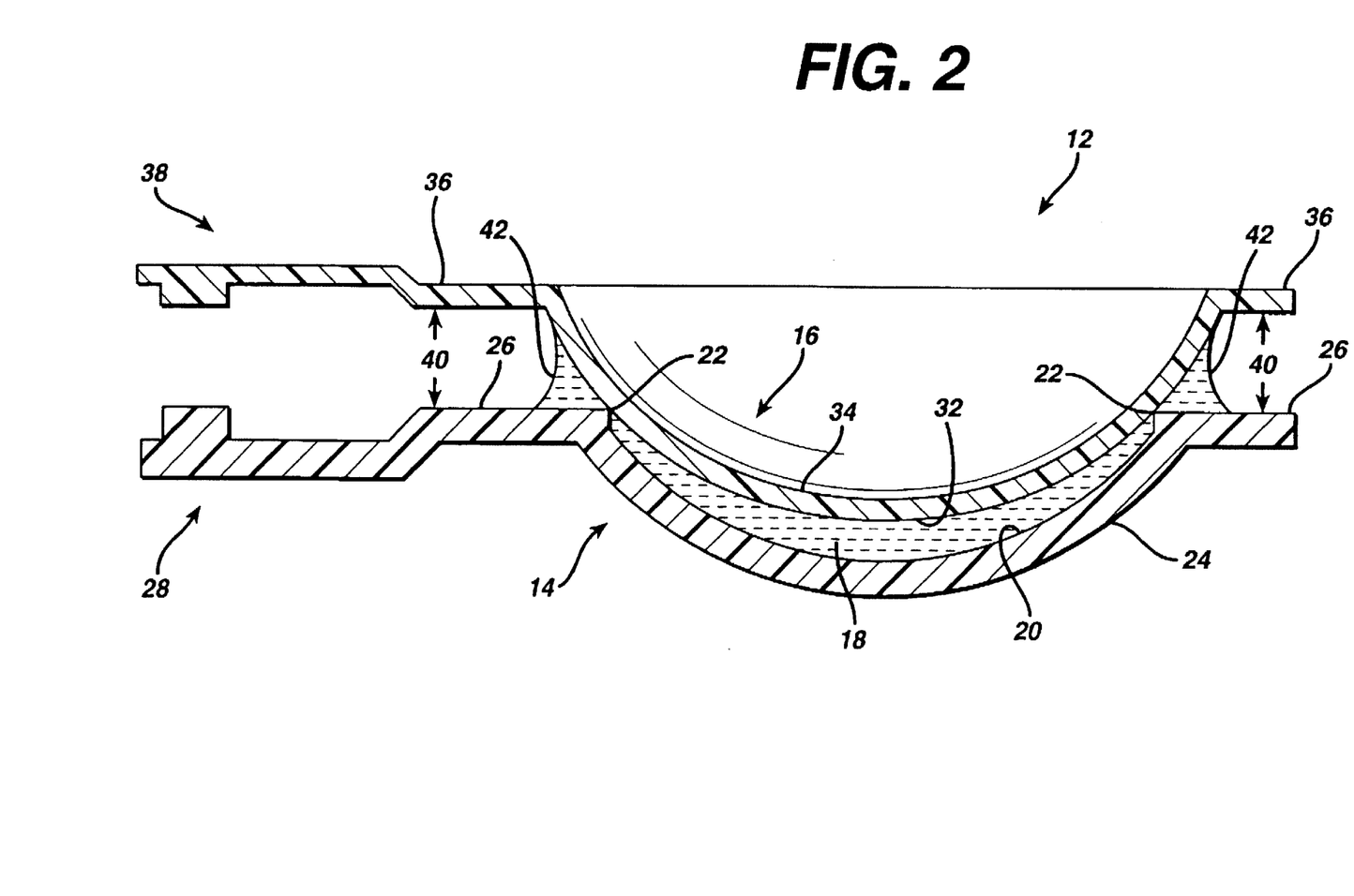
FIG. 2 is an enlarged side elevational and sectional view of a contact lens mold assembly, illustrating details of construction of the lower frontcurve mold and the upper backcurve mold.

Referring to the drawings in detail, and in particular initially to FIGS. 1 and 2, FIG. 1 illustrates a front elevational view of a support pallet 10 which supports thereon an array, typically a two by four array, of contact lens mold assemblies 12, one of which is illustrated in further detail in FIG. 2.

FIG. 2 is an enlarged side elevational and sectional view of one contact lens mold assembly 12 which consists of a lower frontcurve mold 14 and an upper backcurve mold 16, which define therebetween a mold cavity for a contact lens 18.

The frontcurve and backcurve mold halves 14 and 16 are preferably formed of polystyrene but could be any suitable thermoplastic polymer which is sufficiently transparent to ultraviolet light to allow irradiation therethrough with light to promote the subsequent polymerization of a soft contact lens. A suitable thermoplastic such as polystyrene also has other desirable qualities such as being moldable to surfaces of optical quality at relatively low temperatures, having excellent flow characteristics and remaining amorphous during molding, not crystallizing, and have minimal shrinkage during cooling.

The frontcurve mold half 14 defines a central curved section with an optical quality concave surface 20, which has a circular circumferential knife edge 22 extending therearound. The knife edge 22 is desirable to form a sharp and uniform plastic radius parting line (edge) for the subsequently molded soft contact lens 18. A generally parallel convex surface 24 is spaced from the concave surface 20, and an annular essentially uniplanar flange 26 is formed extending radially outwardly from the surfaces 20 and 24. The concave surface 20 has the dimensions of the frontcurve (power curve) of a contact lens to be produced by the mold assembly, and is sufficiently smooth such that the surface of a contact lens formed by polymerization of a polymerizable composition in contact with the surface is of optically acceptable quality. The frontcurve mold half is designed with a thinness, typically 0.8 mm, and rigidity effective to transmit heat therethrough rapidly and to withstand prying forces applied to separate the mold half from the mold assembly during a demolding operation. The frontcurve mold half 14 further defines a generally triangular tab 28, FIGS. 2 and 9, integral with the flange 26 which projects from one side of the flange. Tab 28 is essentially uniplanar and extends to an injection hot tip which supplies molten thermoplastic to form the frontcurve mold half.

The backcurve mold half 16 defines a central curved section with an optical quality convex surface 32, a generally parallel concave surface 34 spaced from the convex surface 32, and an annular essentially uniplanar flange 36 formed extending radially outwardly from the surfaces 32 and 34. The convex surface 32 has the dimensions of the rear curve (which rests upon the cornea of the eye) of a contact lens to be produced by the backcurve mold half, and is sufficiently smooth such that the surface of a contact lens formed by polymerization of a polymerizable composition in contact with the surface is of optically acceptable quality. The backcurve mold half is designed with a thinness, typically 0.6 mm, and rigidity effective to transmit heat therethrough rapidly and to withstand prying forces applied to separate the mold half from the mold assembly during demolding. The backcurve mold half 16 also defines a generally triangular tab 38, similar to the triangular tab 28, integral with the flange which projects from one side of the flange. The tab 38 extends to an injection hot tip which supplies molten thermoplastic to form the backcurve mold half.

During the process of molding a contact lens, an excess amount of polymer or polymer mixture is initially deposited in a frontcurve mold, and then a backcurve mold is placed over the frontcurve mold and pressed thereagainst. This results in excessive polymer in the mold cavity being displaced and discharged therefrom and forming an excess polymer ring 42 outside of the knife edge 22.

The flanges 26 and 36 are designed to assist in demolding and part handling, and also protect the optical surfaces and the knife edge. The geometry of the triangular tabs 28 and 38 serves an additional function in straightening and orienting the assembled frontcurve/backcurve assembly 12 prior to demolding. When a frontcurve mold half or curve 14 is assembled with a backcurve mold half or curve 16, a gap 40 is formed between the two spaced flanges and projecting tabs which is important for demolding. The gap between the tabs is preferably in the range of 1.0 mm–3.0 mm, and is required to assist in the demolding operation, as explained in greater detail hereinbelow.

Referring to FIGS. 1 and 2, the contact lens mold assemblies 12 are supported in the pallet 10 with the annular flanges 26 and tabs 28 of the frontcurve mold 14 recessed slightly below the upper surface of the pallet 10. The annular flanges 36 and tabs 38 of the backcurve mold 16 are raised above the upper surface of the pallet, to allow a mechanical separating member to be inserted between the spaced flanges 26, 36 of the frontcurve and backcurve.

Figure 3:
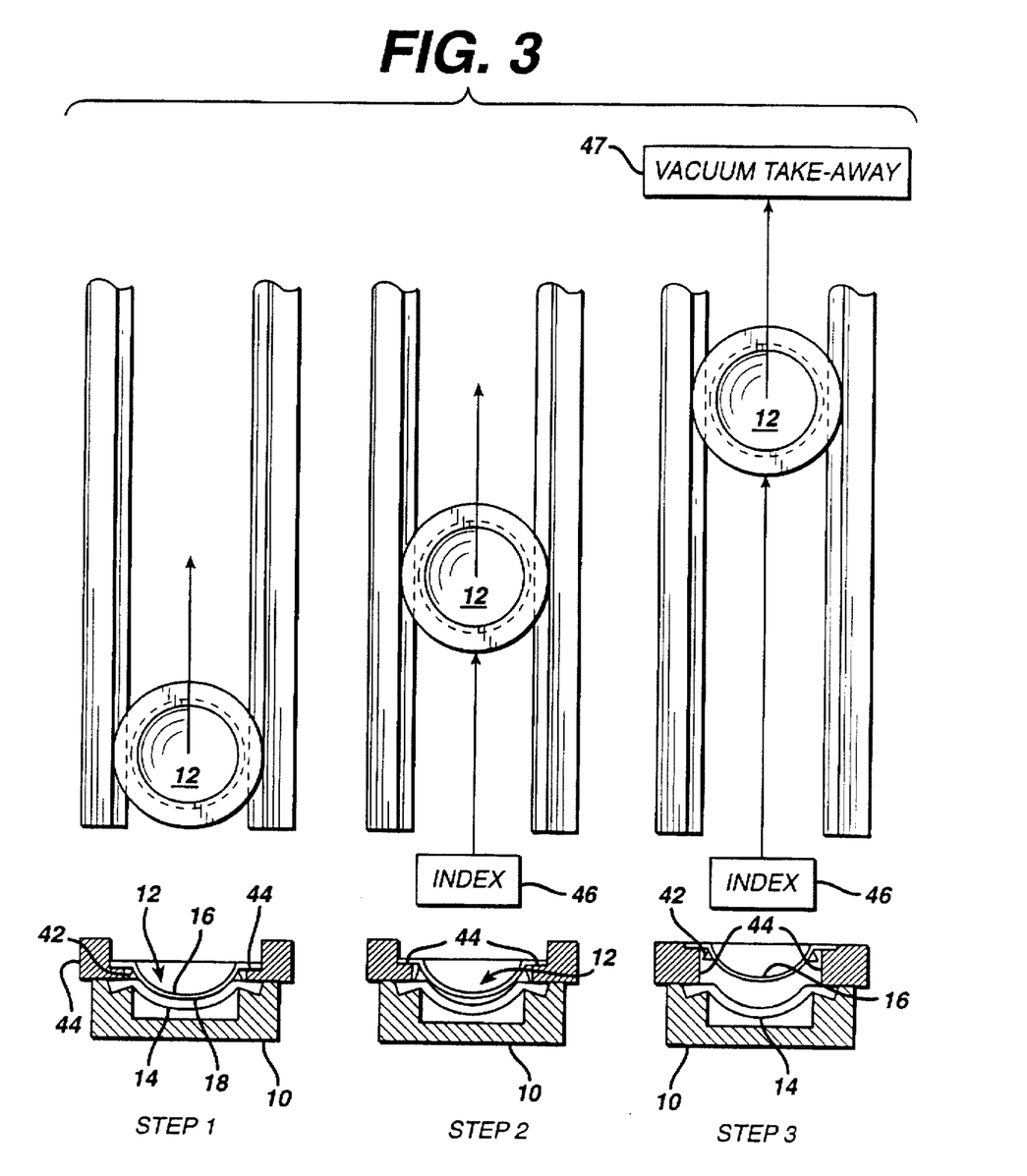
FIG. 3 is a diagrammatic representation of a first embodiment of a wedge type demolding arrangement pursuant to the teachings of the present invention which utilizes a double-sided removal of a backcurve mold.

FIG. 3 is a diagrammatic representation of a first embodiment of a wedge type demolding apparatus and process pursuant to the present invention which utilizes a double-sided removal of the backcurve mold. The demolding apparatus illustrated in FIG. 3 includes a schematically illustrated mold pallet 10, a frontcurve mold 14, a backcurve mold 16, and a demolding cam wedge 44.

The demolding apparatus and process of FIG. 3 operates as follows.

STEP 1: The mold assembly 12, which includes the backcurve mold 16, the frontcurve mold 14, the lens 18 and the excess polymer ring 42, is heated (preferably from the top) at or immediately prior to step 1. The heating process can occur exclusively at step 1, or it may continue throughout the entire demolding operation. At the point illustrated in step 1, the wedge 44 does not stress the backcurve mold 16 and frontcurve mold 14, but is fully engaged in between the flanges 26 and 36 of the backcurve and frontcurve molds. Note that the wedge 44 does not interfere with the excess polymer ring 42 as such interference would cause a fouling condition which would render the process ineffective.

STEP 2: As shown in the top view, the pallet 10 and mold assembly 12 are moved by a product indexer or drive 46 to proceed along the wedges 44. The slope or cam angle of the wedge and/or the feed rate determine the rate of backcurve removal. A nonlinear wedge slope or cam angle and/or feed rate results in a nonlinear backcurve removal rate. The heating process also affects the acceptable removal rate. The amount of excess polymer 42 also influences the process conditions.

STEP 3: At this point, the mold assembly has been moved by the product indexer 46 to a point on the wedges 44 such that the backcurve mold 16 with the excess polymer ring 42 is completely separated from the frontcurve mold 14 and lens 18.

The required amount of separation or wedge height for effective demolding is dependent primarily upon the size of the excess polymer ring and the efficiency of the heating operation. A typical embodiment of the present invention would allow for more wedge height than is theoretically necessary to ensure complete mold removal. At this point or directly thereafter, the now separated backcurve mold 16 and polymer ring 42 are removed by an overhead vacuum take-away system 47 which deposits the backcurves in a waste container for recycling.

Figure 4:
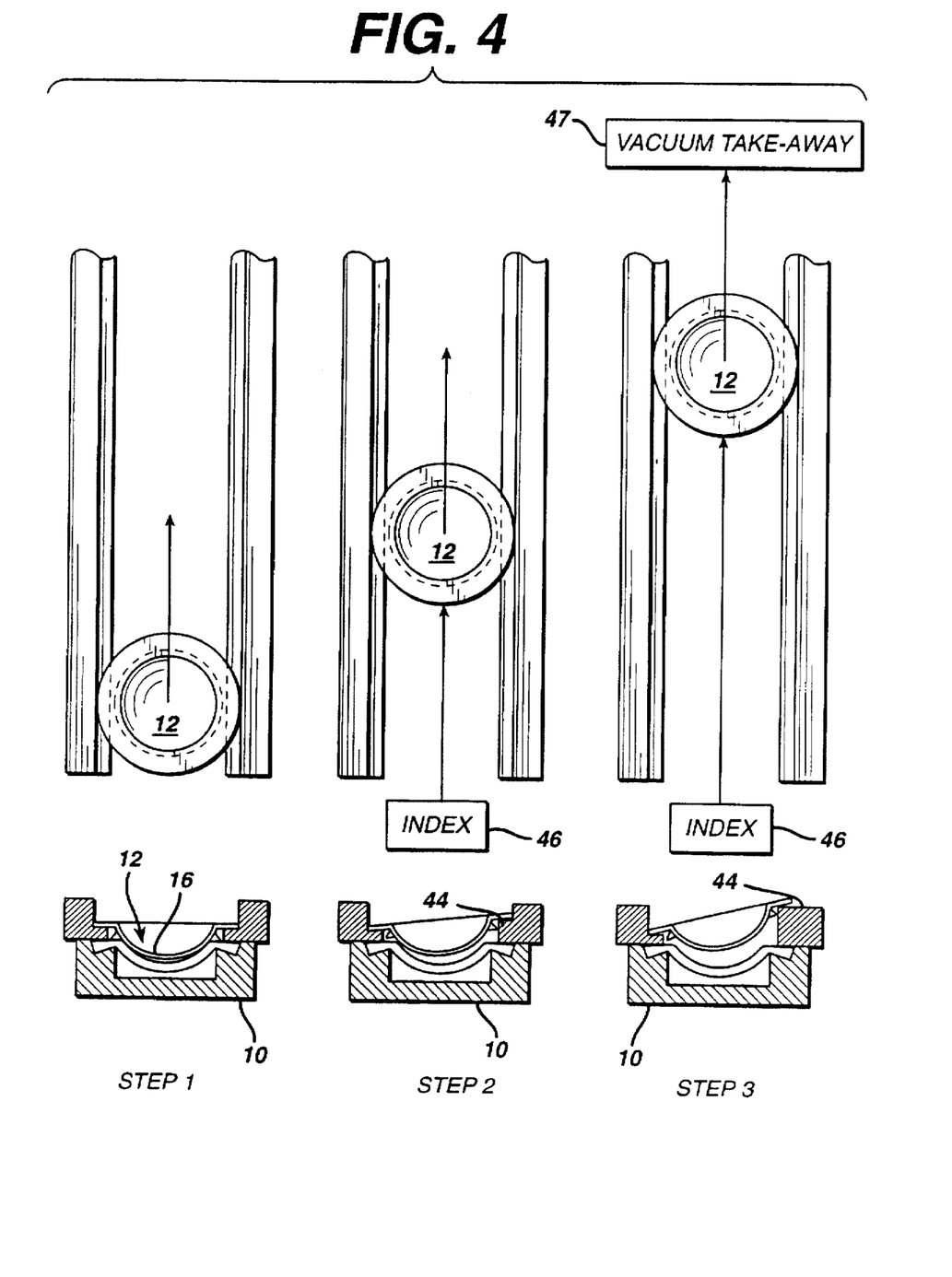
FIG. 4 illustrates an arrangement similar to FIG. 3, but wherein the backcurve is removed by a wedge applied from one side only, such that significant cam or wedge profiling exists primarily on only one side wedge.

FIG. 4 illustrates an arrangement similar to FIG. 3, but wherein the backcurve is removed by a wedge applied from one side only. This one-sided removal configuration is modeled from the one-sided pry process previously and currently used in a contact lens manufacturing process. FIG. 4 illustrates a single sided wedge demolding embodiment in which significant cam or wedge profiling exists primarily on only one wedge 44. Step 3 could also be modified to use wedge profiling on the previously non-profiled wedge. This would allow the backcurve mold to be carried away more effectively once the one sided separation is complete.

Hot Air Heated Wedge

Figure 5:
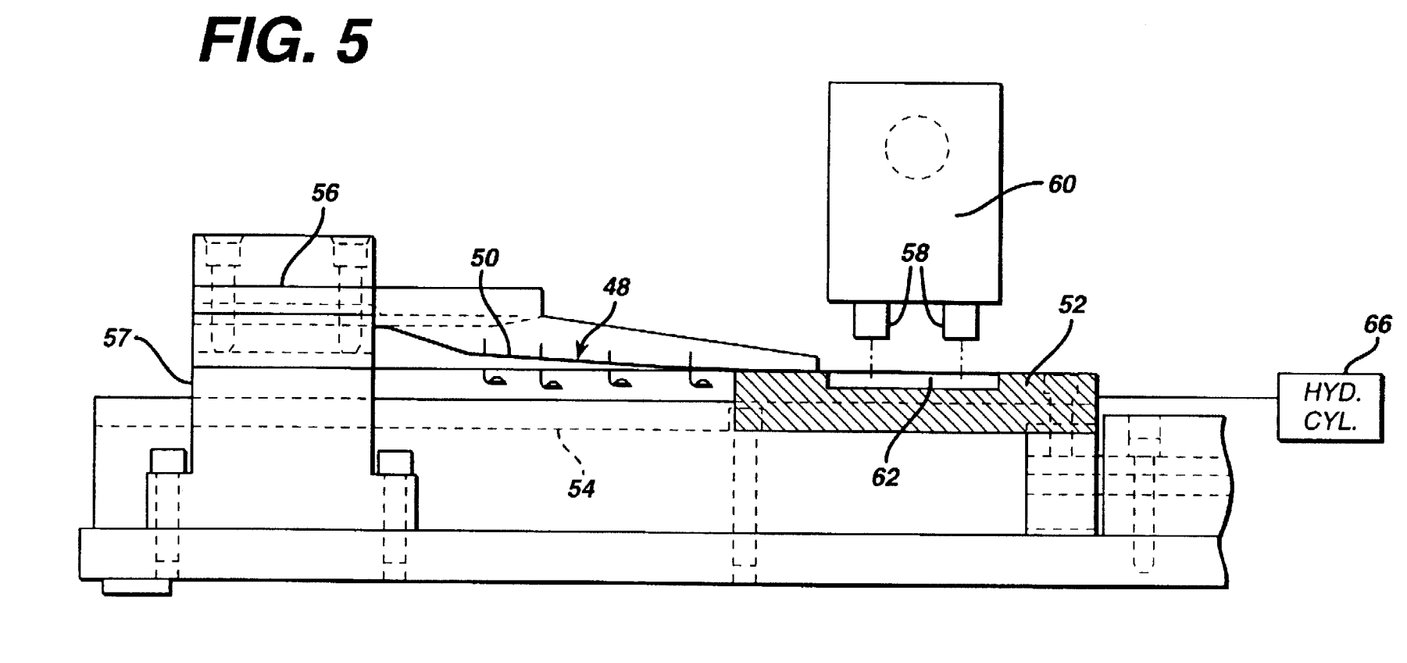
FIGS. 5 and 6 illustrate respectively front elevational and top plan views of an embodiment of an air heated, one sided wedge arrangement pursuant to the subject invention.
Figure 6:
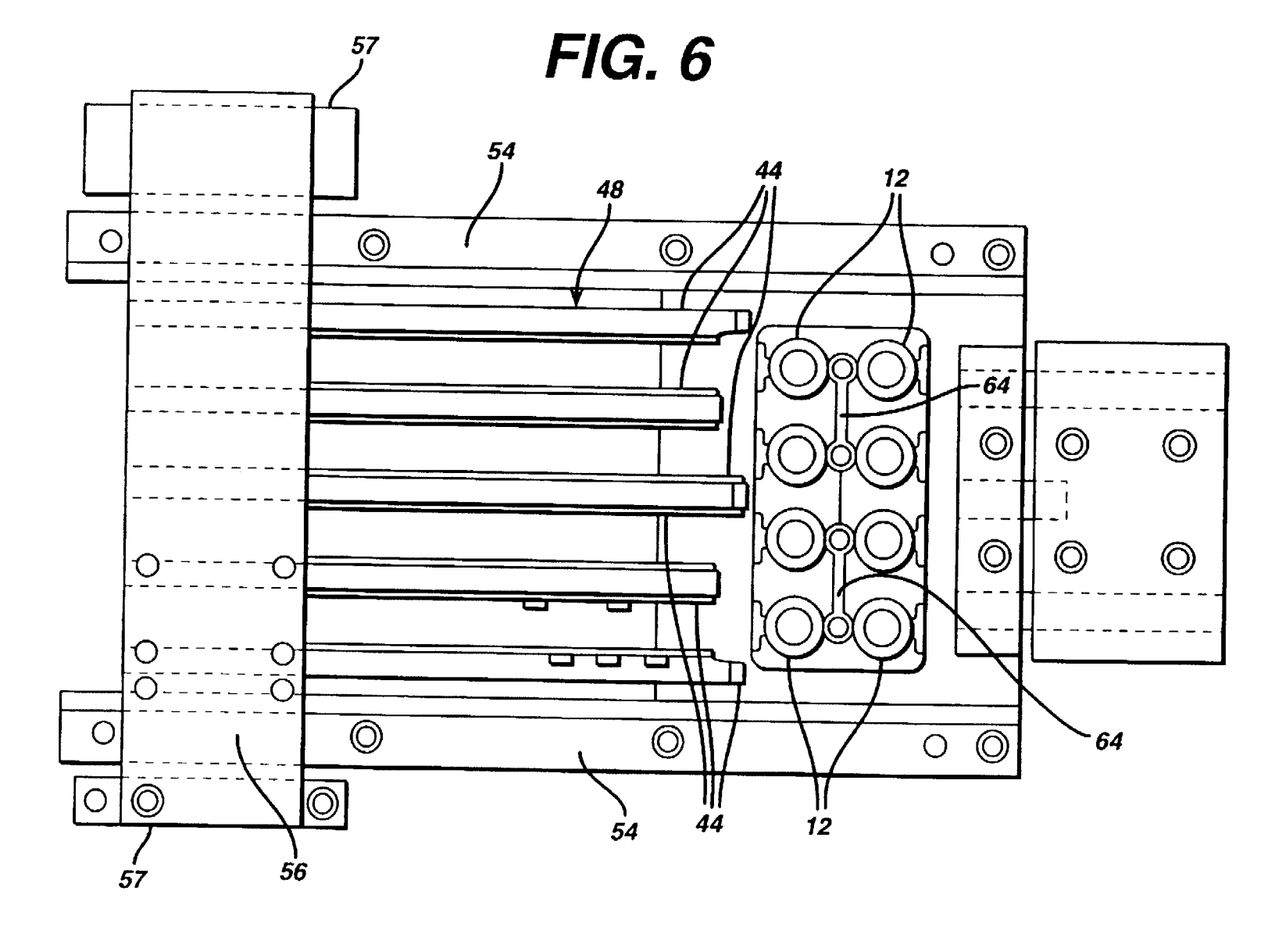

The embodiment of FIGS. 5 and 6 is slightly different from those embodiments previously explained herein in that in this embodiment a 2×4 array of mold assemblies is formed by an interconnected mold frame 64 which physically interconnects each of the frontcurve molds 14. Each backcurve mold 16 is an individual component which is positioned individually on each frontcurve mold 14.

FIGS. 5 and 6 illustrate respectively front elevational and top plan views of an embodiment of an air heated, one sided wedge arrangement which was tried experimentally with success on reduced polymer ring molds. The demolding apparatus and process illustrated in FIGS. 5 and 6 include a wedge fixture or assembly 48 having cam or wedge profiling 50, a moving support pallet 52 defining a mold frame pocket for a mold frame assembly 64, precision guide rails 54, an overhead wedge mount 56, hot air nozzles 58, and a hot air plenum 60.

FIG. 6 illustrates a top plan view of a mold frame 64 defining a 2×4 array of mold assemblies positioned in a support pallet 52. The mold frame 64 and pallet 52 are positioned to present a row of 4 mold assemblies to the wedge separating fixture 48. Accordingly, the wedge separating fixture 48 provides two separating wedges 44 for each of the 4 mold assemblies for a total of 5 separating wedges. The three middle separating wedges are positioned between two adjacent mold assemblies, and provide a wedge or cam profile on both sides thereof to service the two adjacent mold assemblies. The wedge separating fixture 48 is positioned suspended above the support pallet on the overhead mount 56, which is supported by two side upright support 57 inconnected by the horizontally disposed overhead mount 56, on which the wedge separating fixture 48 is mounted.

In operation, the mold frame 64 is placed into the pallet 52 at the position marked 62. A heating process ensues during which hot air emanates from the hot air plenum 60 through the hot air nozzles 58 and is directed onto each mold cavity of the mold frame 64. After a given period of heating time, the pallet 52 and mold frame 64 are indexed or moved from right to left at a specified rate, such as by a hydraulic cylinder 66. Precision guide rails 54 guide this movement underneath the wedge portion of the wedge assembly 48. After the wedge or cam profile 50 has caused the backcurve mold 16 to separate completely from the frontcurve mold 14, the backcurve mold 16 with excess polymer ring 42 remains stationary on the wedge assembly 48 while the pallet 52 and mold frame 64 continue moving completely to the left. At this point, the frontcurve mold frame 14 with lenses 18 are removed from the pallet 52. The unit is then reset for a new cycle.

Infra Red Heated Wedge

Figure 7:
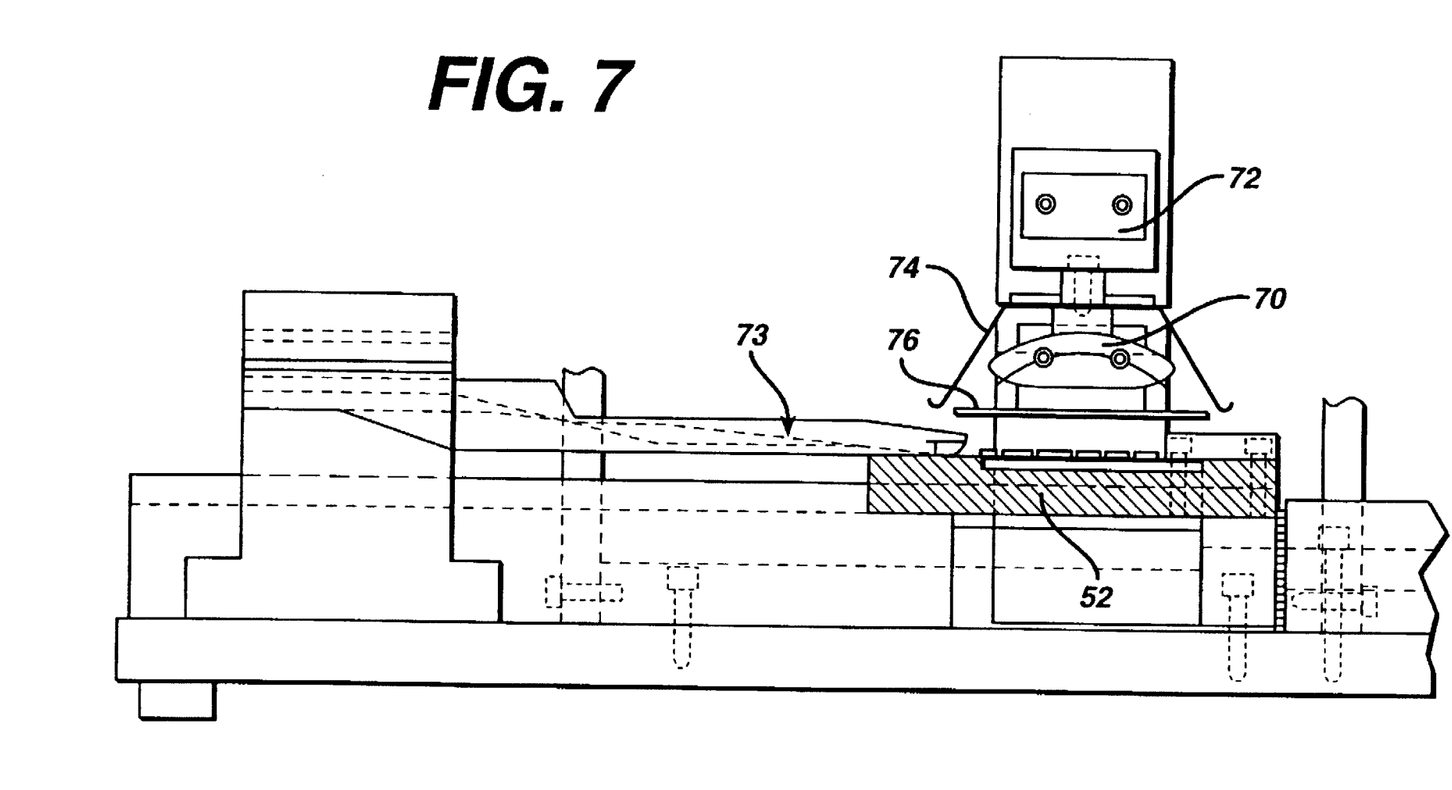
FIG. 7 illustrates an infrared heated embodiment of a one sided wedge type demolding apparatus.

FIG. 7 illustrates an infrared heated embodiment of a one sided wedge type demolding apparatus and process which has been tried experimentally.

A mold frame 64 is placed in a moving pallet 52. Heat is applied to the lens portions of the mold frame by an infrared emitter 70 which is powered and controlled by a solid state relay 72. A heat shield and reflector 74 concentrates the infrared heat towards a heat mask 76. Heat mask 76 is a thin metal plate with eight holes of a diameter equal to the lens and with common centerlines with the mold cavities on the mold frame 64. The heat mask 76 concentrates the heat on the lens 18 portion of the backcurve mold 16 and not on the flange or frame structure. After a specified temperature and time exposure, the pallet 52 is moved at a specified rate from right to left. After a given amount of travel the cam or wedge profiling 78 associated with the wedge fixture or assembly 48 causes the backcurve mold 16 to completely separate from the frontcurve mold frame 64. The pallet 52 continues to its leftmost position, whereupon the mold frame 64 with lenses 18 is removed. The pallet 52 is then reset, and the unit is ready for the next cycle of operation.

Conductive Probe Heated Wedge

Figure 8:
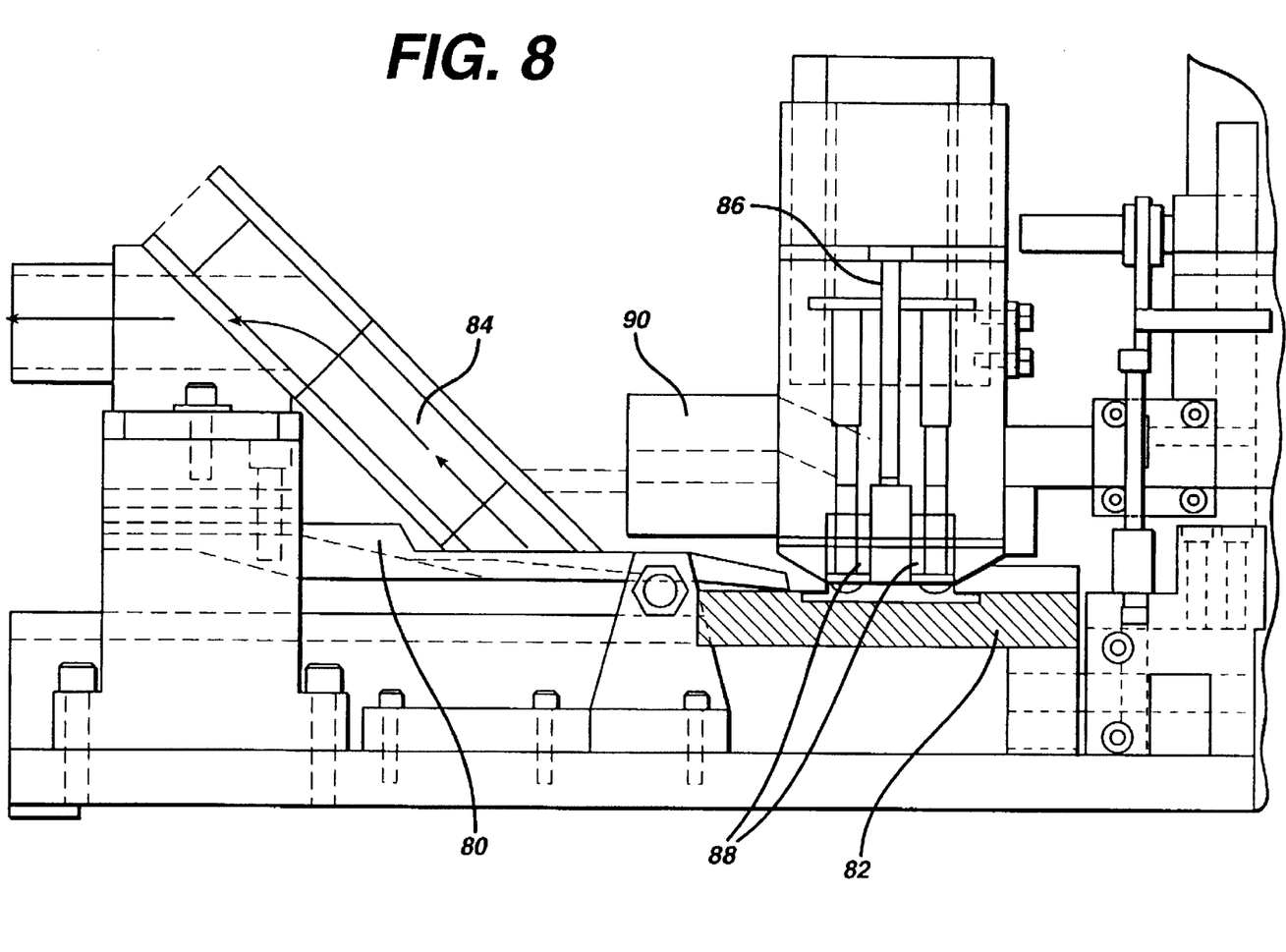
FIG. 8 illustrates a front elevational view of a conductively heated embodiment of a one sided wedge demolding apparatus.
Figure 9:
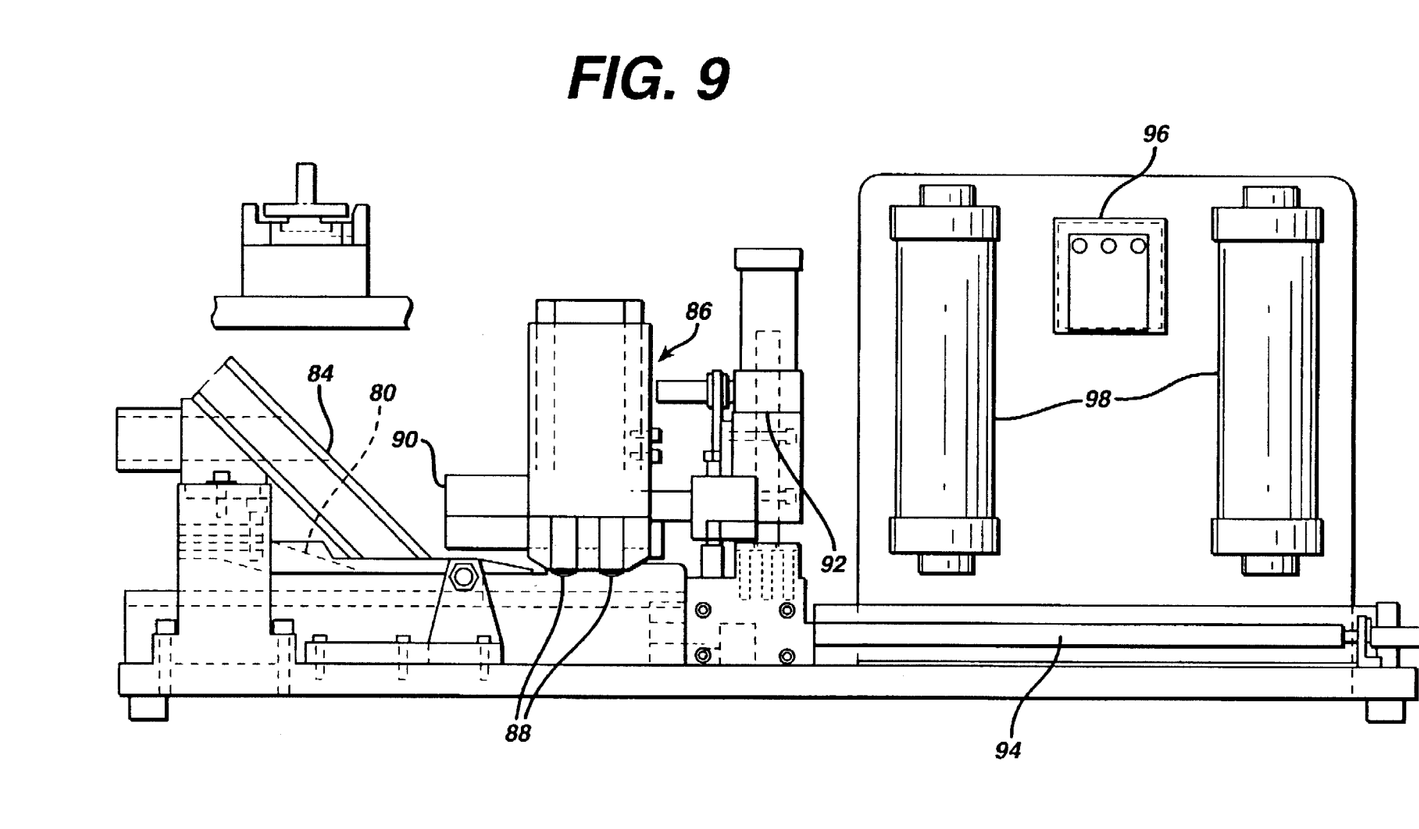
FIGS. 9 and 10 are respectively front elevational and top plan views of the same embodiment of FIG. 8 presented in an overall assembly view of the apparatus.
Figure 10:
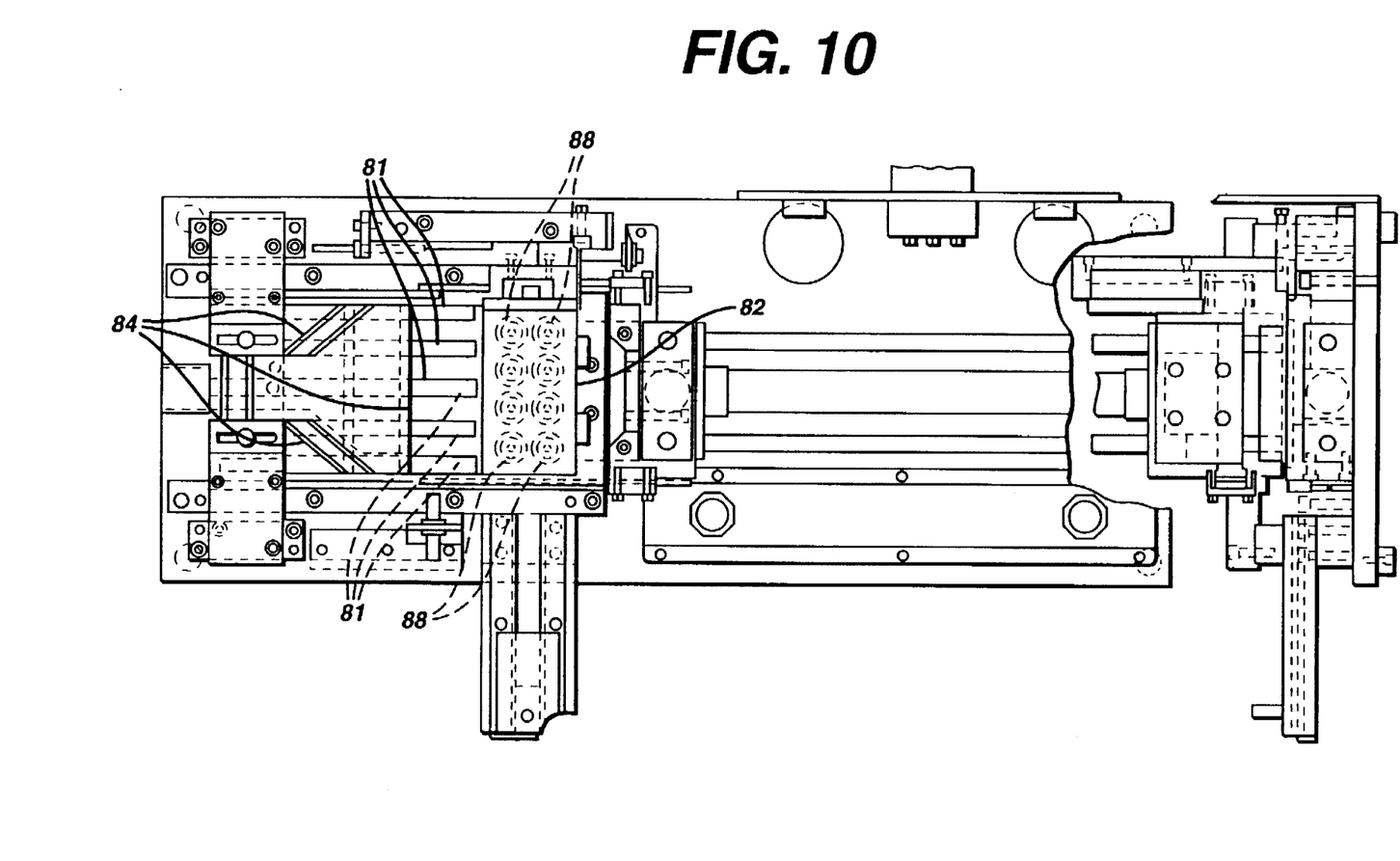

FIG. 8 illustrates a front elevational view of a conductively heated embodiment of a one sided wedge type demolding apparatus designed to utilize molds with reduced excess polymer rings 42. FIGS. 9 and 10 are respectively front elevational and top plan views of the same embodiment of FIG. 8 presented in an overall assembly view of the apparatus.

The demolding arrangement illustrated in FIGS. 8, 9 and 10 includes a wedge assembly or fixture 80, comprised of a plurality of separating wedges 81, a moving support pallet 82, a vacuum take-away hood 84, a heat conductive probe assembly 86 having a 2×4 array of heat conductive probes 88, a heat conductive probe lifting cam 90, a conductive probe assembly lift cylinder 92, a pallet drive hydraulic cylinder 94, a process controller/timer 96, and hydraulic fluid reservoirs 98.

In operation, the heat conductive probe assembly 86 is lifted vertically by the lift cylinder 92 via the lifting cam 90 such that a mold frame assembly 64 can be placed into the support pallet 82 without interfering with the conductive probes 88. The conductive probe assembly 86 is then lowered by the lift cylinder 92 via the lifting cam 90 so that the conductive probes 88 are resting under their own weight on the lens portions of the noncritical side of the backcurve molds 16. At this point, heat is conducted through the conductive probes 88 into the lens mold assemblies. In operation, the conductive probes 88 have cartridge heaters which are maintained at a specific temperature. After a period of time programmed into the process controller/timer 96 has elapsed, the pallet 82 is moved in a right to left direction by the hydraulic cylinder 94 which is fed from the reservoirs 98. The conductive probe assembly 86 is moved simultaneously with the pallet 82 such that the weight of the conductive probe assembly 86 remains fully on the backcurve molds 16. After a given travel distance, the backcurve mold excess polymer rings begin separating by the cam or wedge profiling associated with the wedge assembly 80. At a point before full backcurve mold separation, the cam profile on the conducting probe assembly lifting cam 90 lifts the conductive probe assembly 86 and conductive probes 88 clear of the mold assemblies. As the pallet 82 continues leftward, the backcurves 16 separate completely from the frontcurve frame 64 and are vacuumed away by the vacuum take-away hood 84. The pallet 82 then reaches its leftmost point and the frontcurve mold frame 64 with lenses 18 is removed. The unit is then reset and is ready for the next cycle of operation.

One purpose of maintaining the conductive probes 88 in contact with the backcurve molds 16 while the molds 16 are engaging the wedge assembly 80 is to provide and maintain a normal force on each backcurve mold 16 to counteract a shear force generated by the profiling angle on the wedge and acting on the partially released lens. The hydraulic drive cylinder 94 functions and is used to maintain a constant maximum force on the pallet in the direction of travel thereof. This constant maximum force allows the pallet 82 to slow down or speed up depending upon how much resistance is encountered during the separation of the backcurve. This feature helps to compensate for process variations due to temperature variations, excess polymer ring sizes, etc.

Single Mold Assemblies on a Pallet

Figure 11:
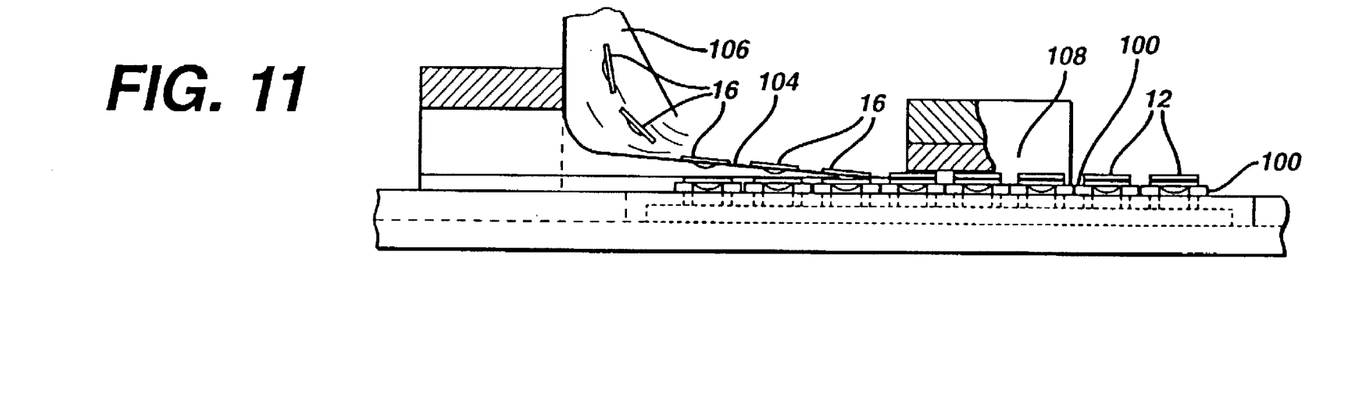
FIGS. 11 and 12 are respectively front elevational and top plan views of a generic wedge type demolding embodiment which utilizes singular lens mold assemblies in a free pallet.
Figure 12:
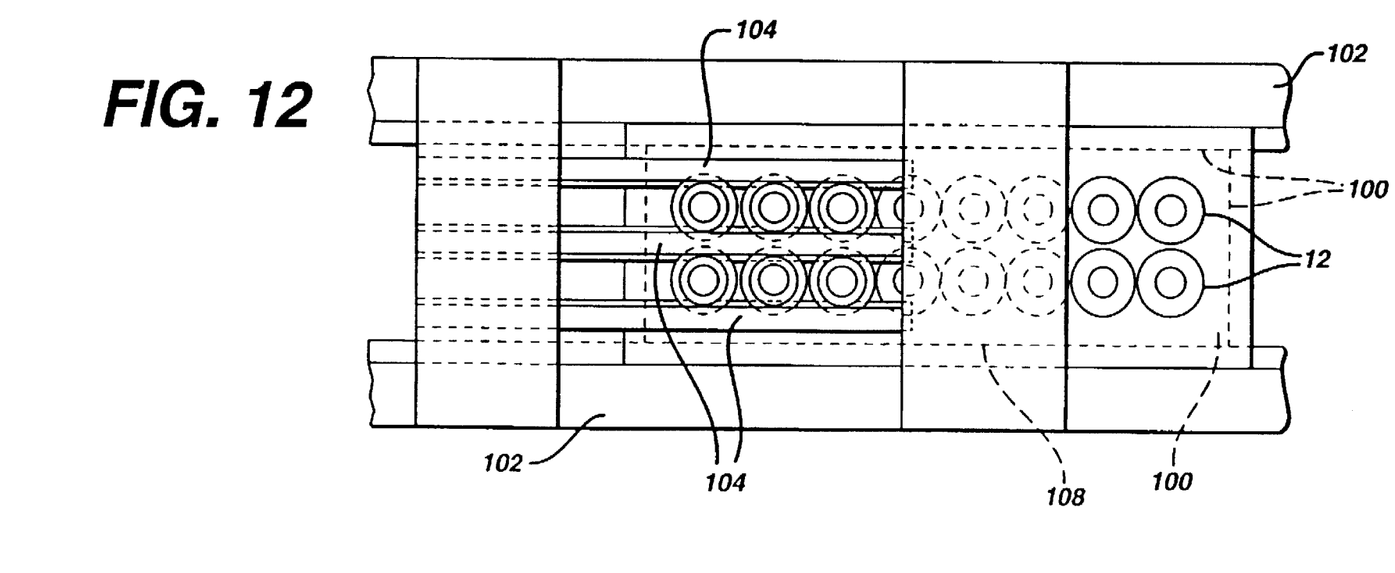

FIGS. 11 and 12 are respectively front elevational and top plan views of a generic wedge type demolding embodiment which utilizes singular lens mold assemblies 12 in a free pallet 10, as illustrated for example in FIG. 1, as opposed to using a mold frame 64 as illustrated in FIG. 6. The demolding apparatus illustrated in FIGS. 11 and 12 includes a pallet 100, pallet guides 102, wedges 104, a vacuum take-away hood 106, a hold down/stabilizer bar 108, and single mold assemblies 12.

Function

In operation, the single mold assemblies 12 are heated either discretely or continuously by any effective known technique such as those described hereinabove. The pallet 100 is moved from right to left by a suitable indexing mechanism. As the single mold assemblies 12 pass underneath the hold down/stabilizer bar 108, they are maintained and captured in their individual nests in the pallet 100. This results in an accurate reference location of the backcurve and frontcurve flanges. Before the single mold assemblies 12 exit from under the hold down/stabilizer bar 108, the wedges 104 have begun engaging, but not stressing, the backcurve molds. The hold down/stabilizer bar 108 prevents the single mold assemblies 12 from being displaced out of their nests or from becoming cocked by the wedges 104. At some point in travel, the backcurve mold 16 and excess polymer ring 42 are completely separated from the frontcurve mold 14 and lens 18. The vacuum take-away hood 106 then vacuums the backcurve molds away. The pallet 100 continues its travel from right to left until all single mold assemblies 12 are demolded, and then moves to the next processing station.

While several embodiments and variations of the present invention for a wedge demolding apparatus and method are described in detail herein, it should be apparent that the disclosure and teachings of the present invention will suggest many alternative designs to those skilled in the art.

What is claimed is:

1. Apparatus for demolding a mold assembly, comprising a frontcurve mold which has a central lens mold section with a surrounding flange, and a corresponding backcurve mold which has a central lens mold section with a surrounding flange, and a molded ophthalmic lens which is formed between the frontcurve and backcurve molds, and wherein the flanges of the frontcurve and backcurve molds are spaced apart relative to each other, comprising:
   a. a support pallet for supporting the mold assembly;
   b. a wedge separating fixture including at least one separating wedge positioned between the spaced flanges of the frontcurve and backcurve molds of the mold assembly; and
   c. means for causing relative translational movement between the wedge separating fixture and the support pallet to progressively separate the frontcurve mold from the backcurve mold.

2. Apparatus for demolding a mold assembly as claimed in claim 1, further including means for stationarily mounting the wedge separating fixture suspended above the support pallet, and an indexing means for conveying the support pallet relative to the stationarily mounted wedge separating fixture and into a position wherein a separating wedge is positioned between the spaced flanges of the mold assembly.

3. Apparatus for demolding a mold assembly as claimed in claim 2, including an overhead vacuum duct, positioned over the support pallet and downstream of the wedge separating fixture in the direction of conveyance of the support pallet, for vacuuming up separated backcurve molds.

4. Apparatus for demolding a mold assembly as claimed in claim 2, wherein guide rails mount the support pallet for translational movement relative to the fixedly mounted wedge separating fixture.

5. Apparatus for demolding a mold assembly as claimed in claim 1, including a vacuum pick up for removing backcurve molds separated during the demolding operation.

6. Apparatus for demolding a mold assembly as claimed in claim 1, wherein the wedge separating fixture includes wedges positioned on opposite sides and between the spaced flanges of the mold assembly.

7. Apparatus for demolding a mold assembly as claimed in claim 1, wherein the support pallet supports an n×m array of mold assemblies.

8. Apparatus for demolding a mold assembly as claimed in claim 7, wherein the wedge separating fixture includes at least n separating wedges, one for each row of the n×m array.

9. Apparatus for demolding a mold assembly as claimed in claim 7, wherein the wedge separating fixture includes two separating wedges for each row of the n×m array, one positioned on each side of each row.

10. Apparatus for demolding a mold assembly as claimed in claim 7, wherein the n×m array of mold assemblies includes a mold frame which interconnects an n×m array of frontcurve molds and an individual backcurve mold is placed over each interconnected frontcurve mold.

11. Apparatus for demolding a mold assembly as claimed in claim 7, wherein the n×m array of mold assemblies includes an n×m array of individual unconnected frontcurve molds, and an individual backcurve mold is placed over each individual frontcurve mold.

12. Apparatus for demolding a mold assembly as claimed in claim 11, wherein a hold down stabilizer bar is positioned above the mold assemblies during the demolding operation to maintain the mold assemblies properly positioned in the support pallet during the demolding operation.

13. Apparatus for demolding a mold assembly as claimed in claim 1, including means for heating the backcurve mold, which heat is conducted by the backcurve mold to cause a temperature gradient between the backcurve mold and the lens being demolded, with the temperature gradient causing a differential expansion and shifting of the surface of the backcurve mold relative to the surface of the lens to lessen the adhesion therebetween to assist in separation of the molds, while leaving the lens in the frontcurve mold.

14. Apparatus for demolding a mold assembly as claimed in claim 13, wherein the heating means includes a hot air plenum and nozzle for directing hot air onto the backcurve mold of the mold assembly.

15. Apparatus for demolding a mold assembly as claimed in claim 13, wherein the heating means includes a radiant infrared heater and reflector for directing infrared radiation onto the backcurve mold of the mold assembly.

16. Apparatus for demolding a mold assembly as claimed in claim 13, wherein the support pallet supports an n×m array of mold assemblies.

17. Apparatus for demolding a mold assembly as claimed in claim 16, wherein a heat mask having n×m apertures, each aperture having a diameter substantially equal to the diameter of a lens, is positioned over the support pallet.

18. Apparatus for demolding a mold assembly as claimed in claim 16, wherein the heating means includes a conductive heating probe assembly, having an n×m array of conductive heating probes therein, which contact each backcurve mold of the n×m array of mold assemblies, for conductively heating the array of mold assemblies.

19. Apparatus for demolding a mold assembly as claimed in claim 18, including a lift cylinder for raising and lowering the conductive heating probe assembly relative to the support pallet, and wherein the weights of the individual conductive heating probes are maintained on the array of mold assemblies during demolding to maintain the array of mold assemblies properly positioned in the support pallet during demolding.

20. Apparatus for demolding a mold assembly as claimed in claim 19, including a conductive probe assembly lifting cam which lifts the conductive probe assembly from the pallet after demolding as an indexing means conveys the pallet past the conductive probe assembly lifting cam.

21. A method of demolding a mold assembly, comprising a frontcurve mold which has a central lens mold section with a surrounding flange, and a corresponding backcurve mold which has a central lens mold section with a surrounding flange, and a molded ophthalmic lens which is formed between the frontcurve and backcurve molds, and wherein the flanges of the frontcurve and backcurve molds are spaced apart relative to each other, comprising:
   a. supporting the mold assembly on a support pallet;
   b. positioning a wedge separating fixture including at least one separating wedge between the spaced flanges of the frontcurve and backcurve molds of the mold assembly; and
   c. relatively translationally moving the wedge separating fixture and the support pallet to progressively separate the frontcurve mold from the backcurve mold.

22. A method of demolding a mold assembly as claimed in claim 21, further including stationarily mounting the wedge separating fixture suspended above the support pallet, and conveying the support pallet relative to the stationarily mounted wedge separating fixture and into a position wherein a separating wedge is positioned between the spaced flanges of the mold assembly.

23. A method of demolding a mold assembly as claimed in claim 21, including removing backcurve molds separated during the demolding operation with a vacuum.

24. A method of demolding a mold assembly as claimed in claim 21, including positioning wedges on opposite sides and between the spaced flanges of the mold assembly.

25. A method of demolding a mold assembly as claimed in claim 21, including supporting an n×m array of mold assemblies in the support pallet.

26. A method of demolding a mold assembly as claimed in claim 25, including using at least n separating wedges, one for each row of the n×m array.

27. A method of demolding a mold assembly as claimed in claim 25, including using two separating wedges for each row of the n×m array, one positioned on each side of each row.

28. A method of demolding a mold assembly as claimed in claim 25, including interconnecting the n×m array of mold assemblies with a mold frame, and placing an individual backcurve mold over each interconnected frontcurve mold.

29. A method of demolding a mold assembly as claimed in claim 25, including using an n×m array of individual unconnected frontcurve molds, and placing an individual backcurve mold over each individual frontcurve mold.

30. A method of demolding a mold assembly as claimed in claim 25, wherein a vertical downward force is applied to each of the mold assemblies during the demolding operation to maintain the mold assemblies properly positioned in the support pallet during the demolding operation.

31. A method of demolding a mold assembly as claimed in claim 21, including heating the backcurve mold, which heat is conducted by the backcurve mold to cause a temperature gradient between the backcurve mold and the lens being demolded, with the temperature gradient causing a differential expansion and shifting of the surface of the backcurve mold relative to the surface of the lens to lessen the adhesion therebetween to assist in separation of the molds, while leaving the lens in the frontcurve mold.

32. Apparatus for demolding a mold assembly as claimed in claim 31, including directing hot air through a hot air plenum and nozzle onto the backcurve mold of the mold assembly.

33. A method of demolding a mold assembly as claimed in claim 31, including directing infrared onto the backcurve mold of the mold assembly with at infrared radiant infrared heater and reflector.

34. A method of demolding a mold assembly as claimed in claim 33, including supporting an n×m array of mold assemblies in the support pallet.

35. A method of demolding a mold assembly as claimed in claim 34, including positioning a heat mask having n×m apertures, each aperture having a diameter substantially equal to the diameter of a lens, over the support pallet.

36. A method of demolding a mold assembly as claimed in claim 25, including contacting each backcurve mold of the n×m array of mold assemblies with a heating means including a conductive heating probe assembly, having an n×m array of conductive heating probes therein to conductively heat the array of mold assemblies.

37. A method of demolding a mold assembly as claimed in claim 36, including raising and lowering the conductive heating probe assembly relative to the support pallet with a lift cylinder.

38. A method of demolding a mold assembly as claimed in claim 37, including maintaining the weights of the individual conductive heating probes on the array of mold assemblies during the demolding operation to maintain the array of mold assemblies properly positioned in the support pallet during the demolding operation.

* * * * *